May 29, 1928.　　　　　　　　　　　　　　　1,671,552
G. SHEARMAN
ALARM AND EMERGENCY SUPPLY FOR TANK DISPENSING DEVICES
Filed Nov. 10, 1927
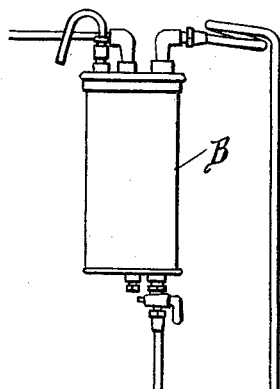
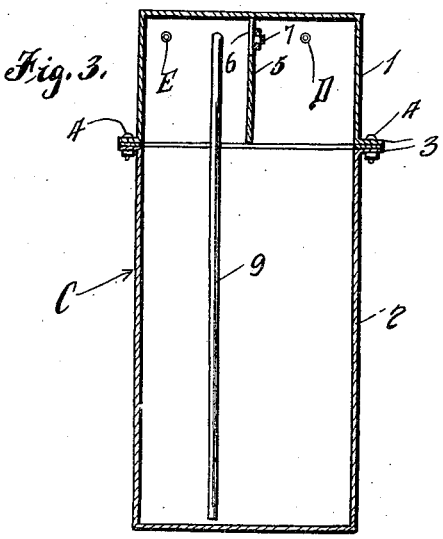
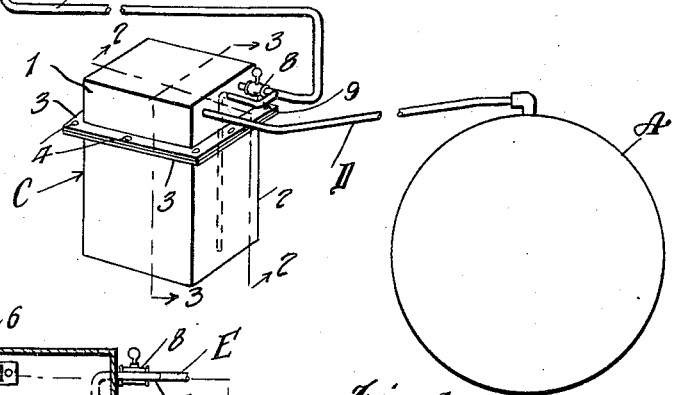
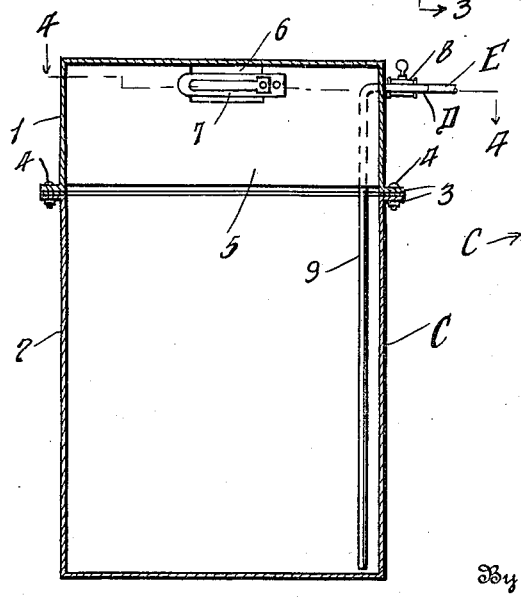
Inventor.
G. Shearman
By
Attorney Patented May 29, 1928.

1,671,552

UNITED STATES PATENT OFFICE.

GEORGE SHEARMAN, OF ATLANTIC CITY, NEW JERSEY.

ALARM AND EMERGENCY SUPPLY FOR TANK DISPENSING DEVICES.

Application filed November 10, 1927. Serial No. 232,454.

The invention relates to dispensing devices for tanks and has particular reference to the fuel line of automobiles and has for its object the provision of a receptacle through which the fuel passes from the fuel tank in the automobile to reach the carburetor, and providing an alarm that is operated by air passing through the fuel line after the fuel is exhausted to give notice to the operator of the vehicle that the supply of liquid in the tank is exhausted and at the same time provide him with emergency supply of fuel to enable him to reach a service station.

A further object of the invention is the provision of a partition in the receptacle arranged in the fuel line having an opening therein in which is arranged an audible signal operated by air when the fuel in the storage tank is exhausted, the fuel serving to couple the signal while a supply of fuel is passing through the receptacle.

The invention will be described in detail hereinafter and will be found illustrated in the accompanying drawings in which Figure 1 is a diagrammatic view of a fuel line for motor vehicles showing the receptacle applied to the fuel line, Figure 2 is a view in section on the plane indicated by the line 2—2 of Figure 1, Figure 3 is a view in section on a plane indicated by the line 3—3 of Figure 1, and Figure 4, a view in section on a plane incated by the line 4—4 of Figure 2.

In the drawings similar reference characters are used to designate corresponding parts throughout the several views.

In Figure 1 is shown a conventional fuel storage tank A and a vacuum tank B and the alarm and emergency supply device designated gereally C. D is a pipe connecting the storage tank A with the device C, and E is a pipe connecting the device C with the vacuum tank B.

As shown in the drawings the alarm and emergency supply device C is made of two sections 1 and 2 having their meeting edges flanged as shown at 3 and secured together therethrough by bolts or rivets suggested at 4, but it will be apparent that any other structure than that shown may be used in place thereof. The part 1 of the tank C is provided with a partition 5 having an opening 6 therein and 7 is a reed associated with said opening, said opening 6 and reed 7 being so positioned in the partition 5 that when the liquid fuel is regulated through the pipes D and E and the device C the reed is submerged within the liquid to prevent sounding, but when the liquid in the storage tank A has been exhausted and air is passing through the pipes D and E to the vacuum tank B, the reed will be agitated by the air passing through the partition above the liquid in the tank to warn the operator of the vehicle that his supply of liquid fuel is exhausted.

To enable the operator to utilize the supply of liquid fuel that is in the device C, the pipe E is supplied with a valve 8 that is preferably arranged for convenient operation on the dash board of the vehicle to close the connection of the pipe E directly with the upper part of the device C, so that the liquid fuel may be drawn from the lower part of the receptacle by means of a pipe 9, thus providing an emergency supply of liquid fuel to enable the operator to proceed to the next liquid fuel filling station to replenish his supply of liquid fuel in the storage tank A. It will be understood that the receptacle C is to be arranged in any convenient position on the automombile so that the valve 8 may be conveniently operated by the operator of the vehicle from the dash board or instrument, the arrangement illustrated in Figure 1 being for illustration of the fuel supply system in connection with the device and not to indicate installation of the apparatus.

It will also be understood that the appliance may be used in connection with the dispensing pipes of tanks generally, especially where a pneumatic system is employed for discharging the contents of the tank and that the invention is not limited to its application in connection with the fuel line of motor vehicles hereinbefore specifically described.

What is claimed is:

1. An alarm for tank dispensing devices, comprising an emergency storage receptacle adapted to be inserted in the dispensing line intermediate of a storage tank, and a vacuum tank, a partition in said receptacle extending from the top thereof part way to its bottom, the dispensing line pipe connection being arranged on opposite sides of said partition, and an air operated signal arranged in said partition and operable only when the liquid is exhausted from the storage tank.

2. An alarm for tank dispensing devices, comprising an emergency storage receptacle adapted to be inserted in the dispensing line intermediate of a storage tank, and a vacuum tank, a partition in said receptacle extending from the top thereof part way to its bottom, the dispensing line pipe connection being arranged on opposite sides of said partition, the partition having an opening therein, and a reed arranged in said opening and operable only when the liquid is exhausted from the storage tank.

3. An alarm for tank dispensing devices, comprising a receptacle, a partition arranged in said receptacle, a pipe connecting the receptacle at one side of the partition with a storage tank, another pipe at the other side of the partition connecting the receptacle with a vacuum tank to discharge liquid from said receptacle, the partition aforesaid extending from the top of the receptacle to a point below the connections of the pipes therewith, a valve in the last mentioned pipe, an emergency discharge pipe connected with the last mentioned pipe and extending to the bottom of the receptacle, and an air operated alarm in said partition.

In testimony whereof I affix my signature.

GEORGE SHEARMAN.